United States Patent
Alonso Esteban et al.

(10) Patent No.: US 9,591,697 B2
(45) Date of Patent: Mar. 7, 2017

(54) COVER PLATE FOR A DOMESTIC APPLIANCE, SAID COVER PLATE HAVING AT LEAST ONE SEMI-TRANSPARENT SUPPORT PLATE, DOMESTIC APPLIANCE FOR PREPARING FOOD AND METHOD FOR PRODUCING A COVER PLATE FOR A DOMESTIC APPLIANCE

(75) Inventors: Rafael Alonso Esteban, Huesca (ES); Miguel Angel Buñuel Magdalena, Saragossa (ES); Francisco Javier Ester Sola, Saragossa (ES); Jose-Ramon Garcia Jimenez, Saragossa (ES); Francisco Javier Pelayo Zueco, Saragossa (ES); Pilar Perez Cabeza, Saragossa (ES); Fernando Planas Layunta, Saragossa (ES); Diego Sancho Martinez, Logroño (ES); Jesus Mario Subias Domingo, Saragossa (ES); Francisco Villuendas Yuste, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 1216 days.

(21) Appl. No.: 13/388,467

(22) PCT Filed: Aug. 6, 2010

(86) PCT No.: PCT/EP2010/061503
§ 371 (c)(1),
(2), (4) Date: Feb. 2, 2012

(87) PCT Pub. No.: WO2011/020719
PCT Pub. Date: Feb. 24, 2011

(65) Prior Publication Data
US 2012/0125315 A1     May 24, 2012

(30) Foreign Application Priority Data

Aug. 17, 2009 (EP) .................................. 09382146
Aug. 18, 2009 (ES) .................................. 200930604
(Continued)

(51) Int. Cl.
| | | |
|---|---|---|
| F24C 15/10 | (2006.01) | |
| H05B 6/12 | (2006.01) | |
| C03C 17/36 | (2006.01) | |

(52) U.S. Cl.
CPC ........... H05B 6/1209 (2013.01); C03C 17/36 (2013.01); C03C 17/3615 (2013.01);
(Continued)

(58) Field of Classification Search
USPC ........... 126/211; 219/448.11, 465.1; 428/141
See application file for complete search history.

(56) References Cited

U.S. PATENT DOCUMENTS

| | | | |
|---|---|---|---|
| 6,914,223 B2 * | 7/2005 | Krause .................... | B44C 1/14 |
| | | | 219/460.1 |
| 2005/0184044 A1 * | 8/2005 | Reiter .................... | G01K 15/00 |
| | | | 219/448.11 |

(Continued)

FOREIGN PATENT DOCUMENTS

| | | |
|---|---|---|
| DE | 20005461 U1 | 6/2000 |
| JP | 2003297540 A | 10/2003 |
| WO | 2007118744 A1 | 10/2007 |

OTHER PUBLICATIONS

International Search Report PCT/EP2010/061503, date Dec. 16, 2010.

*Primary Examiner* — Avinash Savani
(74) *Attorney, Agent, or Firm* — Michael E. Tschupp; Andre Pallapies

(57) ABSTRACT

A cover plate for a domestic appliance includes an at least semi-transparent support plate having a bottom provided
(Continued)

with at least one colored layer and at least one semi-transparent metal layer. The metal layer has at least one continuous cut-out section and the colored layer is arranged in the area of the cut-out section.

16 Claims, 1 Drawing Sheet

(30) Foreign Application Priority Data

| Aug. 18, 2009 | (ES) | ................................. | 200930605 |
| Oct. 1, 2009 | (EP) | ................................. | 09382191 |
| Nov. 5, 2009 | (ES) | ................................. | 200930958 |
| Dec. 23, 2009 | (ES) | ................................. | 200931263 |

(52) U.S. Cl.
 CPC ...... *C03C 17/3626* (2013.01); *C03C 17/3649* (2013.01); *C03C 17/3657* (2013.01); *C03C 2218/36* (2013.01); *Y02B 40/123* (2013.01)

(56) References Cited

U.S. PATENT DOCUMENTS

| 2007/0295711 A1 | 12/2007 | Striegler et al. | |
| 2008/0026493 A1 | 1/2008 | Shakouri et al. | |
| 2008/0099449 A1* | 5/2008 | England | F24C 7/082 219/121.48 |
| 2008/0190409 A1 | 8/2008 | Demol et al. | |

* cited by examiner

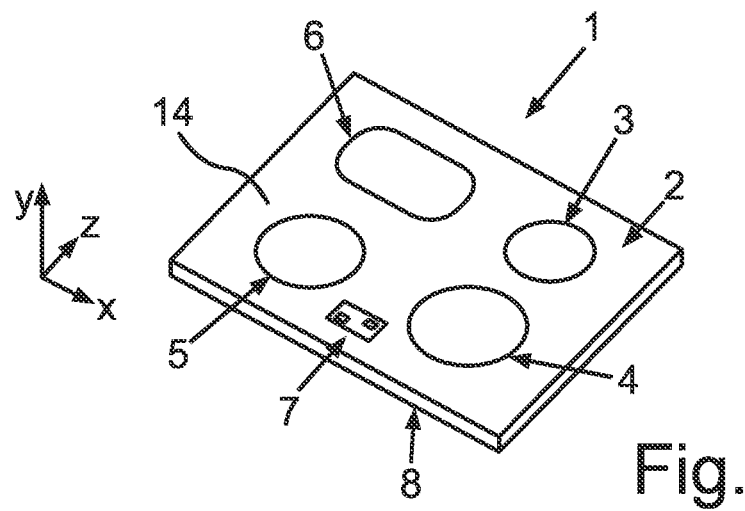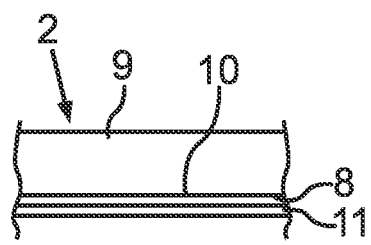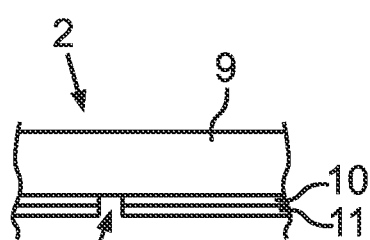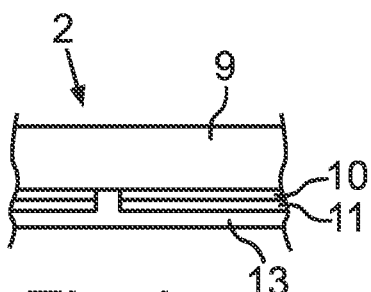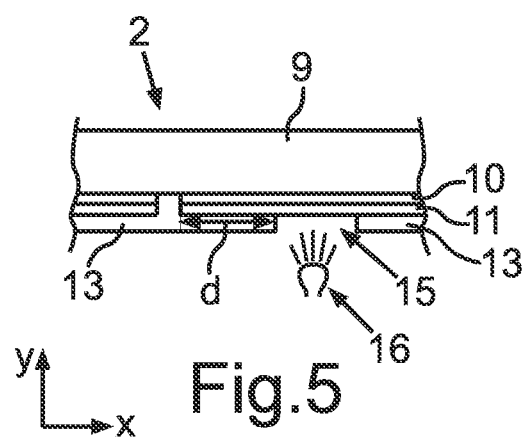

COVER PLATE FOR A DOMESTIC APPLIANCE, SAID COVER PLATE HAVING AT LEAST ONE SEMI-TRANSPARENT SUPPORT PLATE, DOMESTIC APPLIANCE FOR PREPARING FOOD AND METHOD FOR PRODUCING A COVER PLATE FOR A DOMESTIC APPLIANCE

BACKGROUND OF THE INVENTION

The invention relates to a cover plate for a domestic appliance having an at least semi-transparent support plate, on the bottom of which at least one colored layer and at least one semi-transparent or opaque metallic layer are configured. The invention also relates to a domestic appliance for preparing food, in particular a hob, having such a domestic appliance cover plate. The invention also comprises a method for producing a cover plate for a domestic appliance.

Domestic appliance cover plates of corresponding embodiment are known from WO 2007/118744 A1.

A cover plate for a hob is also known from US 2008/0264931 A1, being coated with a semi-transparent metal layer. The semi-transparent metal layer can be applied in addition to a colored layer to produce a metallic shine.

A domestic appliance cover plate having a metal-type layer is also known from WO 2007/118744 A1. This metal-type layer covers decorative segments printed on the rear of the cover plate to protect them.

Representations of symbols, contours and the like, which are to be visible to a user on the top of the cover plate, are only possible to a limited extent with the known embodiments. Instances where an overall impression of metal is to be given and visual displays are to be produced by means of fixed color assignments and also by a light generated by a light source, the possibilities for achieving this with the known cover plates are very limited, giving an impression of poor quality. It is also difficult for a user to recognize such limitations reliably, so misinterpretations can occur. This can ultimately result in safety-critical operating states of the domestic appliance.

BRIEF SUMMARY OF THE INVENTION

The object of the present invention is to configure a domestic appliance cover plate more flexibly in respect of the presentation of visual information and more precisely in respect of user perception. This embodiment of a domestic appliance cover plate is also intended to be robust in respect of method, making it resistant to wear and extremely precise.

According to a first aspect of the invention a domestic appliance cover plate is configured, which comprises an at least semi-transparent support plate. Configured on the bottom of the support plate are at least one colored layer and at least one semi-transparent or opaque metallic layer. Continuous cut-out sections are configured in the metallic layer and the colored layer is configured in the region of the cut-out sections. The layer system beneath the support plate is therefore structured so that when the support plate is viewed from above, the metallic layer can be seen through the at least semi-transparent support plate in large areas and therefore the support plate gives a general impression of metal. The colored layer is configured in the cut-out sections configured in the metallic layer and can also be seen when the support plate is viewed from above, so that different color information and therefore generally a colored presentation of information can be displayed to a user. Provision is therefore made in particular for the colored layer in the layer structure to be configured beneath the support plate and therefore beneath the metallic layer and therefore as it were to cover the metallic layer from below.

The metallic layer is therefore configured between the support plate and the colored layer. In particular the colored layer is therefore configured beneath the metallic layer and also at least partially positioned in the cut-out sections in the metallic layer so that these are as it were filled with the colored layer material.

The color information of the colored layer is different from the color of the metallic layer. The material of the colored layer may feature pigments, dyes, etc. The layer thickness is typically several μm, e.g. 200 μm. The colored layer can be applied by pressing or spraying or other suitable technologies.

In particular the metallic layer is applied using a sputter procedure. This allows particularly thin layers and very precise and durable as well as wear-resistant application of this metallic material.

The cut-out sections in the metallic layer are preferably produced by laser processing and therefore the removal of material by means of laser beams. This embodiment of the cut-out sections allows very complex structures to be introduced into the metallic layer as cut-out sections, which can also be produced extremely precisely and down to the smallest and thinnest dimensions. Also such removal of material from the metallic layer avoids any impairment of the material of the support plate.

The colored layer is preferably configured to be multi-functional and, as well as its function of presenting visual information to a viewer of the support plate, it also has the further functionality of protecting the metallic layer against wear. It is implemented here in particular as a layer to protect against scratching, so the metallic layer is not damaged in this respect.

At least one continuous cut-out section is preferably configured in the colored layer, through which light from a light source of the domestic appliance disposed beneath the colored layer can be directed. This allows the visual information to be presented on the support plate in a much more extended and varied manner, since in addition to the permanently predefined visual information by means of the colored layer in the cut-out sections of the metallic layer, visual information that can be generated as required and in a varied manner is permitted by switching on the light source and shining light by way of the cut-out sections of the colored layer through the at least semi-transparent metallic layer. Extremely varied presentations of visual information can therefore be produced reliably for the user of the domestic appliance, in a manner that can be perceived at any time.

The metallic layer is preferably configured above the colored layer without a cut-out section over the entire surface of the cut-out sections in the colored layer. This produces a layer sequence, in which at the very points where the colored layer has its continuous cut-out section the metallic layer above it is configured without any cut-out section, so that the cut-out section in the colored layer is completely covered by the metallic layer from above and therefore when viewed from the support plate.

It is particularly advantageous for a cut-out section in the metallic layer to be configured without any overlap with a cut-out section in the colored layer. This produces an implementation in which the cut-out section in a metallic layer is configured in a different place from a cut-out section in the colored layer. This allows particularly appropriate visual effects, as there are no cut-out sections that extend continuously through the metallic layer and the colored layer when viewed vertically. Someone viewing the support plate is therefore not hampered or confused by possible unwanted visual effects. Rather it is possible otherwise with such a very advantageous embodiment, when the light source is switched off and the support plate is viewed from above down to the colored material layer that can be seen through the cut-out section in the metallic layer, for a generally uniform visual impression of metal to be produced. Also when the light source is switched on the light passes through the cut-out section in the colored layer and as it were backlights the metallic layer, the light passing through because of its at least semi-transparency and being able to be perceived at this specific point easily and reliably by someone viewing the support plate, so that the information thus conveyed can be perceived in an identifiable manner at any time.

According to a further aspect of the invention a domestic appliance cover plate is configured with an at least semi-transparent support plate, with at least one colored layer and at least one semi-transparent metallic layer configured on the bottom of the support plate. At least one continuous cut-out section is also configured in the colored layer, through which light from a light source of the domestic appliance disposed beneath the colored layer is directed as a function of the operating phase, with the metallic layer being configured above the colored layer without a cut-out section over the entire surface of the cut-out section in the colored layer. The metallic layer therefore covers the cut-out section in the colored layer completely, with the metallic layer being configured between the support plate and the colored layer. This can also permit very specific and individual information presentations for a user, with only the metallic layer and therefore an overall impression of metal being seen in particular when the light source is switched off and the colored layer beneath, its cut-out section and in particular also the light source or further components being seen. In contrast when the light source is switched on, the visual information to be conveyed using the light is displayed and perceived, since the light passes through the cut-out section in the colored layer to the metallic layer and penetrates through it. Embodiments of the domestic appliance cover plate according to the first aspect of the invention should be considered as advantageous embodiments of the domestic appliance cover plate according to the second aspect.

The invention also relates to a domestic appliance for preparing food, in particular a hob, which features a domestic appliance cover plate according to the first aspect or the second aspect of the invention or an advantageous embodiment thereof.

The domestic appliance cover plate is preferably made of glass or a glass ceramic material.

Provision can also be made for not just one metallic semi-transparent layer to be configured but at least two corresponding layers. These are preferably configured between the support plate and the at least one colored layer. At the points where the metallic layer preferably has cut-out sections, these cut-out sections are also configured in the at least second metallic layer.

Provision is made in particular for the at least two metallic layers to be separated from one another by a dielectric separation layer.

The semi-transparent metallic layer has a layer thickness preferably between 10 nm and 50 nm. These layer thicknesses mean that the metallic layer is on the one hand sufficiently transparent to allow illuminating elements, for example display elements such as light-emitting diodes or 7-segment displays, to shine through and also to produce a metallically reflecting surface when the light source is switched off. With layer thicknesses below 10 nm the transparency is too great and no longer allows the coating to appear metallic, while with layer thicknesses above 50 nm the transparency is no longer sufficient to allow display elements and/or heating elements that glow red to shine through. A transmission of 30% to 80% for red light with a wavelength of 700 to 800 nm is particularly advantageous. If the metallic layer is not to be semi-transparent but opaque at least in parts, it can also have layer thicknesses of around 100 nm or more.

The provision of a further metallic layer means that light let through by the semi-transparent first metallic layer can be reflected and can interfere with the light let through in the preferably configured dielectric separation layer. This produces a particularly visually striking, shimmering surface, which offers new possibilities for design and visual information presentation. The thickness of the dielectric separation layer can in particular be less than 800 nm. This puts the layer thickness in the range of the wavelength of visible light, which results in interesting interference effects between the light components reflected by the different metallic layers.

The inventive domestic appliance cover plate can be used in many different fields. For example the cover plate can be used as a hob cover plate for a hob, in particular an induction hob or radiant hob, or as the front panel of a domestic appliance door, for example of an oven, microwave oven or steam cooker. It could also be used in refrigerators, dishwashers, washing machines and tumble dryers. The advantages of the invention come to bear in particular when touch sensors are also disposed behind the cover plate along with display elements, forming a user interface of a domestic appliance. The metallic look can then be perfected so that when the domestic appliance is inactive the user interface disappears almost completely behind the reflecting metal layer. When the domestic appliance is active, light-emitting elements of the user interface can be activated, which then shine through the partially transparent metallic layer.

Damage to or corrosion of the metallic layer can be prevented if it is applied to a rear face of the support plate facing the display element and/or if it is covered by a dielectric protective layer.

Particularly interesting effects can be achieved if the cover plate comprises at least two at least partially transparent metallic layers, the layer thickness of which can be in particular in the above-mentioned range of 10 nm to 50 nm. These can be separated from one another by a dielectric layer, the thickness of which can be in particular between 5 nm and 500 nm, preferably between 10 nm and 100 nm.

A capacitive touch sensor system can be achieved, if at least one of the metallic layers features a break in proximity to a region for covering a touch sensor for the electrical isolation of the region. The touch sensor is then not screened by the entire coating, which acts as a large-surface electrode, but just by a small region of the coating defined and isolated by the in particular linear break, it being possible also for said coating to be completely absent in proximity to the touch sensor. The break can also prevent inductive sensors being screened by the coating.

Provision can be made for a dielectric separation layer to be configured between the colored layer and the metallic layer next to the colored layer.

In possible embodiments at least one of the metallic layers is made from a material selected from the group consisting of silver (Ag), gold (Au), aluminum (Al), molybdenum (Mo), copper (Cu), nickel (Ni), silicon (Si), stainless steel (SSt), titanium (Ti), niobium (Nb), tantalum (Ta), tungsten (W), palladium or an alloy or mixture of two or more of these metals.

A black shimmering layer can be achieved, if a Ni—Cr alloy with 80% nickel and 20% chromium is used.

Oxides selected from the group consisting of stannic oxides, zinc oxides, aluminum oxides, titanium oxides, silicon oxides, nickel oxides, chromium oxides, niobium oxides, tantalum oxides or mixtures thereof and/or nitrides of metallic elements selected from the group consisting of silicon nitrides, titanium nitrides, chromium nitrides and aluminum nitrides or mixtures thereof have proven advantageous as the material for at least one of the dielectric separation layers.

Because the at least one metallic layer can be applied using a sputter procedure, it is possible to save energy and costs compared with known printing methods. Sputter technology also allows more precise and durable application of the material. Also this procedure using a sputter method allows the bottom of the support plate with the coatings to be configured almost flat, which is not possible with conventional pressure methods for applying the layers. It is also possible to achieve a much greater variation in the visual presentation of information, even in respect of color selection. Electromagnetic compatibility can also be improved, as cooking zones of a hob are isolated from the remainder of the surface, in particular metallic layers.

The invention also relates to a first method for producing a domestic appliance cover plate, in which an at least semi-transparent or opaque support plate is prepared and at least one semi-transparent metallic layer and a colored layer are configured on the bottom. At least one continuous cut-out section is configured in the metal layer and the colored layer is configured beneath the metallic layer at least in the region of the cut-out section.

Provision is preferably made for the metallic layer to be applied using a sputter procedure and the cut-out sections then to be configured in the metallic layer to be produced using laser material removal.

Preferably at least one continuous cut-out section is configured in the colored layer, through which light in a light source disposed below the colored layer can be directed.

The cut-out section in the colored layer is preferably configured in such a manner that it is completely covered by the metallic layer; in particular a cut-out section in the colored layer is configured without any overlap with a cut-out section in the metallic layer.

The invention also relates to a method for producing a domestic appliance cover plate, in which at least one semi-transparent support plate is prepared and at least one semi-transparent metallic layer and a colored layer are configured on the bottom. At least one continuous cut-out section is configured in the colored layer, through which light from a light source of the domestic appliance that can be disposed beneath the colored layer is directed as a function of the operating phase, and the metallic layer is configured above the colored layer without a cut-out section over the entire surface of the cut-out section in the colored layer.

Advantageous embodiments of the domestic appliance cover plates are to be considered as advantageous embodiments of the methods.

Further features of the invention will emerge from the claims, figures and description of the figures. The features and feature combinations set out above in the description as well as the features and feature combinations illustrated in the description of the figures alone and/or in the figures alone can be used not only in the combination cited in each instance but also in other combinations or alone, without departing from the scope of the invention.

BRIEF DESCRIPTION OF THE DRAWINGS

Exemplary embodiments are described in more detail below based on schematic drawings, in which:

FIG. 1 shows a perspective view of an exemplary embodiment of an inventive hob;

FIG. 2 shows a sectional view through a partial section according to a first stage of manufacture of a domestic appliance cover plate of the hob according to FIG. 1;

FIG. 3 shows a view according to FIG. 2 in a second stage of manufacture;

FIG. 4 shows a view according to FIGS. 2 and 3 in a third stage of manufacture; and FIG. 5 shows a view according to FIGS. 2 to 4 in a fourth stage of manufacture.

DETAILED DESCRIPTION OF EXEMPLARY EMBODIMENTS OF THE PRESENT INVENTION

Identical elements or elements of identical function are shown with identical reference characters in the figures.

FIG. 1 shows a simplified perspective view of a hob 1 for preparing food. The hob 1 comprises a glass ceramic plate 2 as the domestic appliance cover plate. Preparation vessels such as pans, pots and the like can be positioned on this. Cooking zones 3, 4, 5 and 6 are identified for this purpose. Heating elements are positioned beneath the glass ceramic plate 2 at these points of the cooking zones 3 to 6, so that said zones can be heated. An operating and/or display field 7 is also configured.

The cooking zones 3 to 6 with their specific contour markings are displayed visually and can be seen when the glass ceramic plate 2 is viewed from above. Additional visual information can also be displayed constantly and/or as a function of the operating phase in the operating and/or display field 7.

A plurality of layers are applied to the bottom 8 of the glass ceramic plate 2 to display the information visually.

The layer structure and production of the layers is described in more detail below.

FIG. 2 shows a simplified sectional view of a partial section of the hob 1, the sectional plane lying in the x-y plane. With regard to the production of the domestic appliance cover plate form for the glass ceramic plate 2, a support plate 9 is configured for this purpose, made of glass or glass ceramic. Configured on the bottom 8 of this support plate 9 is at least one metallic layer 10, which is applied using a sputter procedure. In the exemplary embodiment provision is made, after the application of this first metallic layer 10, which is configured as semi-transparent, for a protective layer 11 to be configured, which can be correspondingly semi-transparent or even completely transparent. The degree of transparency in the exemplary embodiment is at least as great as the degree of transparency of the metallic layer 10. Alternatively the metallic layer can also be configured as opaque.

A cut-out section 12 is then produced both in the protective layer 11 and in the metallic layer 10 according to the diagram in FIG. 3. The cut-out section 12 is therefore totally continuous through both said layers 10 and 11.

It should also be noted that in addition to the one metallic layer at least a second further metallic layer can be provided, with two metallic layers then preferably being separated by a dielectric separation layer.

The cut-out 12 is produced using a suitable laser. This allows very precise and the smallest and thinnest accurate contours to be produced and material to be removed accurately, so that very complex and thin visual information can be displayed.

In a further method step a colored layer 13 is then configured beneath the metallic layer 10 and beneath the protective layer 11 according to the diagram in FIG. 4. The colored layer 13 is made of a material that is different from the material of the metallic layer 10 and in particular also different from the protective layer 11. The colored layer 10 is in particular configured so that it lies beneath the entire surface of the layers 10 and 11. The colored layer 10 can also be applied for example using a sputter procedure.

Visual information that is displayed using color can therefore be produced constantly. In the exemplary embodiment provision is made for example for the circumferential boundary line and therefore the contour of a cooking zone 3 to 6, for example the contour 14 of the cooking zone 5, to be shown through the cut-out section 12 and the colored layer 13. The colored embodiment of the colored layer 13 is different from the color or metallic color impression of the layer 10.

In a further subsequent method step a cut-out section 15 is then produced in the colored layer 13, this also being configured in a continuous manner through the colored layer 13. This cut-out section 15 is also produced by removing material by means of laser, so that it can be completed very precisely here and also without impairing the layers 11 and 10 disposed above. The cut-out section 15 can extend over parts of the display field 7 or over the entire display field 7.

Provision is also made in particular and as an essential feature for the cut-out section 15 to be disposed without any overlap with the cut-out section 12 in the layers 10 and 11 disposed above when viewed in an x-direction. In the exemplary embodiment a distance d is also configured for this purpose. This prevents the configuration of a cut-out section that continues through all the layers of the support plate 9.

A particularly appropriate visual information presentation can be ensured. The constantly displayed visual information in the form of the contour line 14 with coloring by means of the colored layer 13 can be seen reliably and clearly by a viewer of the hob 1. Further visual information can also be displayed as a function of the operating phase. In this context a light source 16 is configured, which is disposed beneath the support plate 9 and in the exemplary embodiment is positioned directly beneath the cut-out section 15 in the colored layer 13. With the light source 16, which can be a light-emitting diode for example, switched off, when the support plate 9 is viewed from above at this point above the cut-out section 15, only a visual metallic embodiment according to the layer 10 can be perceived. Neither the colored layer 13 nor the cut-out section 15 nor the light source 16 can be seen in such an operating mode. When the light source 16 is switched on, someone looking at the top of the support plate 9 can see this light and the associated visual information, since the light from the light source 16 penetrates by way of the cut-out section 15 through the semi-transparent layers 10 and 11. In this instance the layers 10, 11 must be configured as at least semi-transparent. Provision can be made for a transparent protective layer to be applied in the region of the cut-out section 15. Its thickness can be for example several 100 μm. When the support plate 9 is viewed from above with the light source 16 switched on, only the light is seen through the layers 10 and 11; the light source 16 as a component is however not visible.

Examples of such layer sequences are glass, iron or steel and titanium nitrite to produce a steel-like color, glass, silicon dioxide, copper, silicon dioxide, iron (steel) and silicon dioxide for a red shimmer, glass, silicon dioxide, a silicon-aluminum alloy (SiAl), silicon dioxide, iron (steel) and silicon dioxide for a yellow color and glass, silicon dioxide, iron (steel), silicon dioxide, iron (steel) and silicon dioxide in different layer thicknesses for a bluish or grayish coloring.

The protective layer made of titanium nitrate is particularly robust. The protective layer serves among other things to prevent oxidation of the metallic layer at high temperatures.

Electrical switching circuits can be engraved in the different metallic layers with the aid of a laser and the metallic layers can be provided with contact elements (not shown here), in order to be able to use the metallic layers as conductors for transmitting control signals or the like.

In the exemplary embodiments described above the separation layers can be made of oxides of tin, zinc, titanium, aluminum, silicon, tantalum, niobium, nickel, chromium or mixtures thereof and/or of nitrides of titanium, silicon, aluminum, nickel, chromium or mixtures thereof.

REFERENCE CHARACTERS

1 Hob
2 Glass ceramic plate
3 to 6 Cooking zones
7 Display field
8 Bottom
9 Support plate
10, 11 Layers
12 Cut-out section
13 Colored layer
14 Contour line
15 Cut-out section
16 Light source
d Distance

The invention claimed is:

1. A domestic appliance cover plate, comprising:
an at least semi-transparent support plate having a bottom provided with at least one colored layer and at least one semi-transparent or opaque metallic layer,
wherein the metallic layer has at least one continuous cut-out section, said colored layer being provided in a region of the cut-out section;
the domestic appliance further comprising a light source disposed beneath the colored layer, said colored layer having at least one continuous cut-out section for passage of light from the light source;
wherein the metallic layer is configured to extend above the colored layer without a cut-out section over an entire surface of the cut-out section in the colored layer.

2. The domestic appliance cover plate of claim 1, wherein the colored layer is formed beneath the metallic layer.

3. The domestic appliance cover plate of claim 1, wherein the metallic layer is applied using a sputter procedure.

4. The domestic appliance cover plate of claim 1, wherein the cut-out section in the metallic layer is produced by laser processing.

5. The domestic appliance cover plate of claim 1, wherein the colored layer is configured as a visual information display layer and as a scratch protection layer for the metallic layer.

6. The domestic appliance cover plate of claim 1, wherein the cut-out section in the metallic layer is configured without any overlap with the cut-out section in the colored layer.

7. A domestic appliance for preparing food, said domestic appliance comprising:
 a domestic appliance cover plate which includes an at least semi-transparent support plate having a bottom provided with at least one colored layer; and
 at least one semi-transparent or opaque metallic layer,
 wherein the metallic layer has at least one continuous cut-out section, said colored layer being provided in a region of the cut-out section;
 the domestic appliance further comprising a light source disposed beneath the colored layer, said colored layer having at least one continuous cut-out section for passage of light from the light source;
 wherein the metallic layer is configured to extend above the colored layer without a cut-out section over an entire surface of the cut-out section in the colored layer.

8. The domestic appliance of claim 7, constructed in the form of a hob.

9. The domestic appliance of claim 7, wherein the colored layer is formed beneath the metallic layer.

10. The domestic appliance of claim 7, wherein the metallic layer is applied using a sputter procedure.

11. The domestic appliance of claim 7, wherein the cut-out section in the metallic layer is produced by laser processing.

12. The domestic appliance of claim 7, wherein the colored layer is configured as a visual information display layer and as a scratch protection layer for the metallic layer.

13. The domestic appliance of claim 7, wherein the cut-out section in the metallic layer is configured without any overlap with the cut-out section in the colored layer.

14. A method for producing a domestic appliance cover plate, comprising:
 applying at least one semi-transparent or opaque metallic layer on a bottom of an at least semi-transparent support plate;
 forming at least one continuous cut-out section in the metallic layer; and
 applying a colored layer beneath the metallic layer at least in a region of the cut-out section;
 wherein the cut-out section in the colored layer is configured so as to be completely covered by the metallic layer; and
 wherein the cut-out section in the colored layer is configured without any overlap with the cut-out section in the metallic layer.

15. The method of claim 14, wherein the metallic layer is applied using a sputter procedure and the cut-out section is produced by laser processing.

16. The method of claim 14, further comprising forming at least one continuous cut-out section in the colored layer for passage of light from a light source disposed beneath the colored layer.

* * * * *